Patented Jan. 22, 1946

2,393,537

UNITED STATES PATENT OFFICE 2,393,537

CATALYTIC DEHYDROGENATION

Hal C. Huffman, Long Beach, Calif., assignor to Union Oil Company of California, Los Angeles, Calif., a corporation of California No Drawing. Application March 24, 1942, Serial No. 435,971

9 Claims. (Cl. 260—680)

This invention relates to catalytic processes for the processing of various hydrocarbons. More particularly, the invention relates to the catalytic dehydrogenation of relatively low molecular weight mono-olefins such as normal butylenes, amylenes and the like to produce diolefins such as butadiene, isoprene and the like. The invention also relates to the catalytic dehydrogenation of relatively low molecular weight paraffin hydrocarbons, such as butane, pentanes and the like to produce butadiene and the like.

The principal objects of the invention are to provide an efficient catalyst which is comparatively easy to manufacture, has a long catalytic life, is not easily poisoned and at the same time causes an adequately high conversion of mono-olefinic hydrocarbons to diolefinic hydrocarbons. A more specific object of the invention is to provide a catalyst composition containing a promoter for the catalytic agent which permits the catalyst to effect a higher degree of dehydrogenation and for a longer period of time. A further object of my invention is to provide a two-stage dehydrogenation process wherein relatively low molecular weight paraffin hydrocarbons are dehydrogenated in one stage to mono-olefins and the latter are dehydrogenated in a second stage to diolefins. Other and more specific objects of the invention will become apparent as the description thereof proceeds.

Catalytic dehydrogenation of mono-olefinic hydrocarbons to diolefinic hydrocarbons is well known. For this purpose, it has previously been proposed to use as a catalyst an activated aluminum oxide supporting a relatively small amount of an oxide of chromium, molybdenum, tungsten, titanium, zirconium, cerium, hafnium, vanadium, columbium or tantalum.

I have discovered that the presence in the catalyst of a small amount of a beryllium compound, such as beryllia, not only increases the activity of the foregoing dehydrogenation catalyst to a large extent but maintains the catalytic life of these catalysts at a high level for a considerably longer time than in the case where the same catalyst is used but with the beryllium compound absent. I have found this to be particularly true in the case of chromium oxide or molybdenum oxide distended on alumina. A composition of 1 to 10% chromium oxide, 75 to 98% activated alumina and 1 to 15% beryllia has been found to be a particularly excellent catalyst for dehydrogenating hydrocarbon gases, such as alpha and beta butenes to produce 1,3-butadiene. This catalyst is also effective for dehydrogenating normal butane to produce the butenes. The invention may perhaps be best understood by reference to the following examples which are merely illustrative of the invention and are not to be taken as limiting my invention.

Example 1

A catalyst was prepared as follows:

Commercial activated alumina (14-20 mesh) was dried by heating it to a temperature of 450° F. for about 8 hours. The dried alumina was then impregnated with a water solution of beryllium nitrate. The volume of the solution was such that all of the solution was adsorbed on the alumina. This was then dried by heating it first at 450° F. for 4 hours and then at 750° F. for an additional 4 hours. The dried material was then impregnated with a water solution of chromium nitrate having a volume just small enough to be completely adsorbed, after which the material was dried in a manner similar to that used after the first impregnation. This material was then heated to about 750° F. and purged with nitrogen. The resulting catalyst was composed of approximately 5% chromium oxide, 5% beryllia and 90% alumina by weight.

This catalyst was then used to dehydrogenate a mixture of 93% alpha and beta butenes and 7% butane at a temperature of about 1100° F. under a pressure of 210 mm. of mercury and at a space velocity of about 4.2 volumes of the gases measured at atmospheric pressure per volume of catalyst per minute. The gases from the reaction zone were condensed in a receiver cooled by means of Dry Ice. The condensate was found to contain approximately 24% of 1,3-butadiene. The duration of the run was three hours without intermediate regeneration of the catalyst.

Example 2

In another run using the same catalyst under the same conditions and the same feed stock except that the run was carried out at atmospheric pressure and one volume of butenes was mixed with two volumes of nitrogen, substantially the same results were obtained. This run indicates that substantially the same results may be obtained by carrying out the dehydrogenation either at atmospheric pressure in the presence of an inert gas which reduces the partial pressure of the butenes or under reduced pressure.

Example 3

In another run, a mixture of 50% butenes and 50% butane was passed through the same catalyst described in Example 1 at a temperature of about 1100° F. at atmospheric pressure and at a space velocity of about 30.4 volumes of the gas per volume of catalyst per minute. At the end of an hour's run, it was found that approximately 10% of the mixture had been converted to butadiene.

The effect of the beryllia is apparently one of true promotion of the catalyst as distinguished from the use of the substances as a catalyst per se. Beryllia, when used alone as a catalyst under the foregoing described conditions of operation, showed practically no ability to catalyze the dehydrogenation of the butenes. A catalyst consisting of 10% beryllia and 90% alumina also showed little catalytic activity to dehydrogenate.

While the conversion has been illustrated using chromium oxide-alumina as the catalyst and beryllia as the promoter, it is within the spirit of my invention to use beryllia for the promotion of other catalysts in the dehydrogenation of mono-olefins to diolefins. Such other catalysts include the metal oxides, chromates, sulfates, nitrates, chlorides and other suitable salts of chromium, molybdenum, cobalt, nickel, zinc, iron, lead, cadmium, vanadium, manganese, titanium, tantalum, tungsten, platinum, columbium, scandium, thorium, uranium, zirconium, tin, copper, cerium, hafnium supported on such carriers as alumina, activated carbon, magnesium oxide, silica-alumina mixtures, zirconia, titania, thoria and the like. The oxides of chromium or molybdenum distended on activated alumina are preferred. Preferably, the amount of beryllia should be approximately 5% by weight of the total composition, although I have found that the beryllia content may be lowered to 2.5% without materially affecting the performance of the catalyst.

The catalyst composition should preferably be free from metallic halides, particularly metallic fluorides, such as sodium fluoride since the presence of the metallic halides tends to flux the catalyst in such manner as to cause it to lose its activated structure. The amount of halides present in the catalyst should be less than 0.2% and preferably less than 0.001%. A suitable alumina, for example, is one prepared and sold commercially by the Aluminum Ore Company of St. Louis, Missouri, under as grade $xF-1$. This alumina and chemically pure reagents dissolved in distilled water were used in the foregoing examples.

In order to distend the beryllia and the chromium oxide or other oxide, etc., on the alumina, it is preferable to employ an aqueous solution of a suitable salt of the metal. In the case of beryllia, $Be(NO_3)_2.3H_2O$ or $BeSO_4.4H_2O$ may be used and in the case of the chromium oxide, $CrO_3$, $(NH_4)_2Cr_2O_7$ or $Cr(NO_3)_3.9H_2O$ may be employed. It is preferable to form the chromium sesquioxide on the alumina. These are impregnated in the alumina and then dried at two different temperature levels. The primary drying is effected at a lower temperature of the order of 400–500° F. and the final drying is accomplished at a higher temperature between approximately 750 and 1000° F. and even higher in those cases where the catalyst is employed at higher dehydrogenation temperatures. It is preferable to distend first one of the oxides on the alumina and then the other as illustrated in Example 1. However, simultaneous deposition of the beryllium and chromium salts on the alumina is satisfactory when an impregnating solution of beryllium and chromium or other metal nitrates is used. The drying is accomplished in the same manner described above.

It is also within the limits of the present invention to mix aqueous suspensions of hydrous gels of the oxides or to even coprecipitate an aqueous solution of the metal salts by means of a base. For example, appropriate proportions of aluminum, chromium and beryllium nitrates dissolved in water could be coprecipitated by the addition of ammonium hydroxide and the precipitate subsequently washed free of salts and dried. However, I prefer to form the catalyst as previously described.

When employing a paraffin hydrocarbon as the starting material to produce the diolefin, the process may be carried out in two catalytic dehydrogenation stages in which the paraffin hydrocarbon is dehydrogenated in the first stage to the corresponding mono-olefin and the latter is dehydrogenated in the second stage to the corresponding diolefin. For example, normal butane may be dehydrogenated in the first catalytic dehydrogenation stage under dehydrogenating conditions adapted to produce a substantial amount of butenes and the latter may then be dehydrogenated in accordance with the method described herein to produce butadiene.

The first stage of dehydrogenation may or may not be in the presence of a dehydrogenating catalyst. The mono-olefins may be recovered from gases produced by thermal cracking of oils or gases. In the case of butenes, these are obtained after pressure distillate has been stabilized to remove the propanes from the pressure distillate. The pressure distillate is then debutanized to remove both butanes and butenes. The latter may then be fractionated to separate the normal butenes and the latter sent to the second dehydrogenation stage or the mixture may be employed directly for dehydrogenation into butadiene after removal of isohydrocarbons.

When operating on a fraction consisting predominantly of butane, the dehydrogenation may be carried out in the presence of the dehydrogenating catalysts disclosed above. Since the catalytic composition which I employ for producing the diolefins is also a superior dehydrogenating catalyst for producing mono-olefins from the paraffin hydrocarbons, I prefer to use this catalyst for the first dehydrogenating step. The following example will illustrate the use of my catalyst for dehydrogenating normal butane to butenes.

*Example 4*

The catalyst consisting of 5% chromium oxide, 5% beryllia and 90% activated alumina described and prepared in accordance with Example 1 was used. The catalyst was placed in a vertical reaction chamber and preheated substantially pure normal butane was passed through the catalyst bed at atmospheric pressure and at a space velocity of about 15.2 volumes of the butane per volume of catalyst per minute. The catalyst bed was maintained at about 1050° F. The reaction product collected at the end of a two hour period, an analysis of the products showed a composition of about 25% hydrogen, 23% butenes, 2% of lower olefins and 50% normal butane. The olefins produced were 95 to 97% normal butenes and the volume was substantially equal to that of the hydrogen evolved.

In carrying out the foregoing dehydrogenation of the paraffin to the mono-olefin, temperatures between about 1000 and 1100° F., space velocities between about 4 and 30 and pressures between about 2 atmospheres and 200 mm. of mercury may be used.

The butenes and unreacted butane were separated from the other gases formed during the dehydrogenation by cooling and fractionating the butenes and butane from the hydrogen and other products of reaction. The mixture of butenes and butane was then dehydrogenated in a second reaction vessel under the temperature, pressure and space velocity conditions described in Example 1.

In carrying out the dehydrogenation of the butenes, substantially the same temperatures, pressures and space velocities may be used as in the first dehydrogenation stage. However, in carrying out the reaction at pressures above about 400 mm. of mercury, it is preferable to introduce an inert gas together with the gases to be dehydrogenated in order to reduce the partial pressure of the gases. Preferably, the pressure employed for the second reaction stage should be lower than that of the first stage unless an inert gas is introduced into the gases entering the second reaction zone. Inert gases which may be employed for this purpose include nitrogen, helium, neon, methane, ethane, etc.

The reaction mixture consisting of 1,3-butadiene, unreacted butenes, butane and other products of reaction was condensed and fractionated to remove a mixture of the butadiene, butenes and butane from the other products of reaction. This mixture, composed of approximately 15 parts of butadiene, 18 parts of butenes and 67 parts of butane, was counter-currently passed in contact with ethyl thioglycollic acid. Approximately 15 parts of the gaseous mixture were contacted per volume of the acid at a temperature of about 80° F. and atmospheric pressure. The unabsorbed gas consisting of butane and butenes was separated from the solution of acid and the latter was then heated to 120° F. to remove the 1.3 butadiene extracted by the acid. The gas separated from the solvent consisted of approximately 98% of 1.3 butadiene and a small amount of butane and was recovered practically quantitatively.

In the foregoing example, instead of using ethyl thioglycollic acid as the extraction solvent for separating the butadiene from the gaseous mixture, other mercapto-substituted carboxylic acids containing one or more carboxyl groups may be used such as ethyl thioethanoic acid, 3-propylthiopropanoic acid, 4 - cyclohexylthiobutanoic acid, 2 - methy - 3 - phenylthiopropanoic acid, 2-isopropylthio-3-butanoic acid, 2-propenylthio-4-pentanoic acid, etc.

In some cases, it may be desirable to separate the butenes formed in the first dehydrogenation stage from the products of reaction including the unreacted butane before subjecting the butenes to the second dehydrogenation stage. This may be accomplished by subjecting the mixture of butenes and butane recovered after separating the other products of reaction, such as hydrogen, to either an extraction with a solvent adapted to selectively extract the butenes from the butanes. The extraction is preferably carried out in the vapor phase, although liquid phase extraction may be employed. Solvents adapted to extract the butenes from the butanes include sulfur dioxide, furfural, cresylic acid, amyl alcohol, etc.

The foregoing description of my invention is not to be taken as limiting my invention but only as illustrative thereof since many variations may be made by those skilled in the art without departing from the scope of the following claims.

I claim:

1. A process for the treatment of a hydrocarbon mixture containing mono-olefins of the class consisting of normal butylenes and amylenes which comprises contacting said hydrocarbon mixture with a catalyst at an elevated temperature and thereby converting the said mono-olefins to diolefins, said catalyst consisting of a minor proportion of a compound of a metal selected from the metals of the left-hand columns of groups IV, V and VI of the periodic table, a major proportion of a carrier, and a small proportion between about 1% and 15% of a beryllium compound, and having been prepared by adsorbing on said carrier, aqueous solutions of salts of said metal and of beryllium salts, followed by converting the salts to the corresponding oxides.

2. A process for the treatment of a hydrocarbon mixture containing mono-olefins of the class consisting of normal butylenes and amylenes which comprises contacting said hydrocarbon mixture with a catalyst at an elevated temperature and thereby converting the said mono-olefins to diolefins, said catalyst consisting of a minor proportion of a compound of a metal selected from the metals of the left-hand columns of groups IV, V and VI of the periodic table, a major proportion of activated alumina, and a small proportion between about 1% and 15% of a beryllium compound, and having been prepared by adsorbing on said alumina, aqueous solutions of salts of said metal and of beryllium salts, followed by converting the salts to the corresponding oxides.

3. A process for the treatment of a hydrocarbon mixture containing mono-olefins of the class consisting of normal butylenes and amylenes which comprises contacting said hydrocarbon mixture with a catalyst at an elevated temperature and thereby converting the said mono-olefins to diolefins, said catalyst consisting of a minor proportion of a compound of a metal selected from the metals of the left-hand column of group VI of the periodic table, a major proportion of activated alumina, and a small proportion between about 1% and 15% of a beryllium compound, and having been prepared by adsorbing on said alumina, aqueous solutions of salts of said metal and of beryllium salts, followed by converting the salts to the corresponding oxides.

4. A process for the treatment of a hydrocarbon mixture containing mono-olefins of the class consisting of normal butylenes and amylenes which comprises contacting said hydrocarbon mixture with a catalyst at an elevated temperature and thereby converting the said mono-olefins to diolefins, said catalyst being prepared by adsorbing on granular alumina, aqueous solutions of beryllium salts and salts of metals selected from the left hand column of the sixth group of the periodic table, followed by reducing the salts to the corresponding oxides.

5. A process for the treatment of a hydrocarbon mixture containing mono-olefins of the class consisting of normal butylenes and amylenes which comprises contacting said hydrocarbon mixture with a catalyst at an elevated temperature and thereby converting the said mono-olefins to diolefins, said catalyst comprising a minor proportion of chromium oxide, a major proportion of aluminum oxide, and a small proportion between about 1% and 15% of beryllium oxide, and having been prepared by adsorbing on said aluminum oxide, aqueous solutions of salts of chromium and of beryllium, followed by converting the salts to the corresponding oxides.

6. A process for the treatment of a hydrocarbon mixture containing mono-olefins of the class consisting of normal butylenes and amylenes which comprises contacting said hydrocarbon mixture with a catalyst at an elevated temperature and thereby converting the said mono-olefins to di-olefins, said catalyst comprising a minor proportion of molybdenum oxide, a major proportion of aluminum oxide, and a small proportion between about 1% and 15% of a beryllium compound, and having been prepared by adsorbing on said aluminum oxide, aqueous solutions of salts of molybdenum and of beryllium, followed by converting the salts to the corresponding oxides.

7. A process for the treatment of a hydrocarbon mixture containing normal butylenes which comprises contacting said hydrocarbon mixture with a catalyst at an elevated temperature and thereby converting said butylenes to butadiene, said catalyst consisting of a minor proportion of a compound of a metal selected from the metals of the left-hand columns of groups IV, V and VI of the periodic table, a major proportion of a carrier, and a small proportion between about 1% and 15% of a beryllium compound.

8. A process for the treatment of a hydrocarbon mixture containing normal butylenes which comprises contacting said hydrocarbon mixture containing normal butylenes with a catalyst at an elevated temperature and thereby converting said butylenes to butadiene, said catalyst being prepared by adsorbing on granular alumina aqueous solutions of a beryllium salt and a salt of a metal selected from the left-hand columns of groups IV, V and VI of the periodic table, and reducing the salts to the corresponding oxides.

9. A process according to claim 8 in which the catalyst comprises approximately 90% alumina, 5% chromia and 5% beryllia.

HAL C. HUFFMAN.